United States Patent Office 3,448,499
Patented June 10, 1969

3,448,499
METHOD OF AND APPARATUS FOR COMPRESSIVELY SHRINKING FABRIC
Alexander Friedrich Czernin, Iver Heath, England, assignor to Pasolds Limited, Langley, Buckinghamshire, England
Filed Oct. 20, 1966, Ser. No. 588,155
Claims priority, application Great Britain, Nov. 18, 1965, 49,005/65
Int. Cl. D06c 21/00
U.S. Cl. 26—18.6   9 Claims

ABSTRACT OF THE DISCLOSURE

The compressive shrinking of fabrics in which a fabric which has been rendered compliant is conveyed between two perforated components movable at different speeds so arranged that a portion of one component is adjacent a portion of the other component. The components are moved so that the adjacent portions move in parallel directions. Pressure differentials are applied across a part of each component to hold the fabric substantially immovably in contact with the faster and slower components at regions immediately before and after the fabric reaches and has passed between the respective adjacent portions.

---

Figure 1:
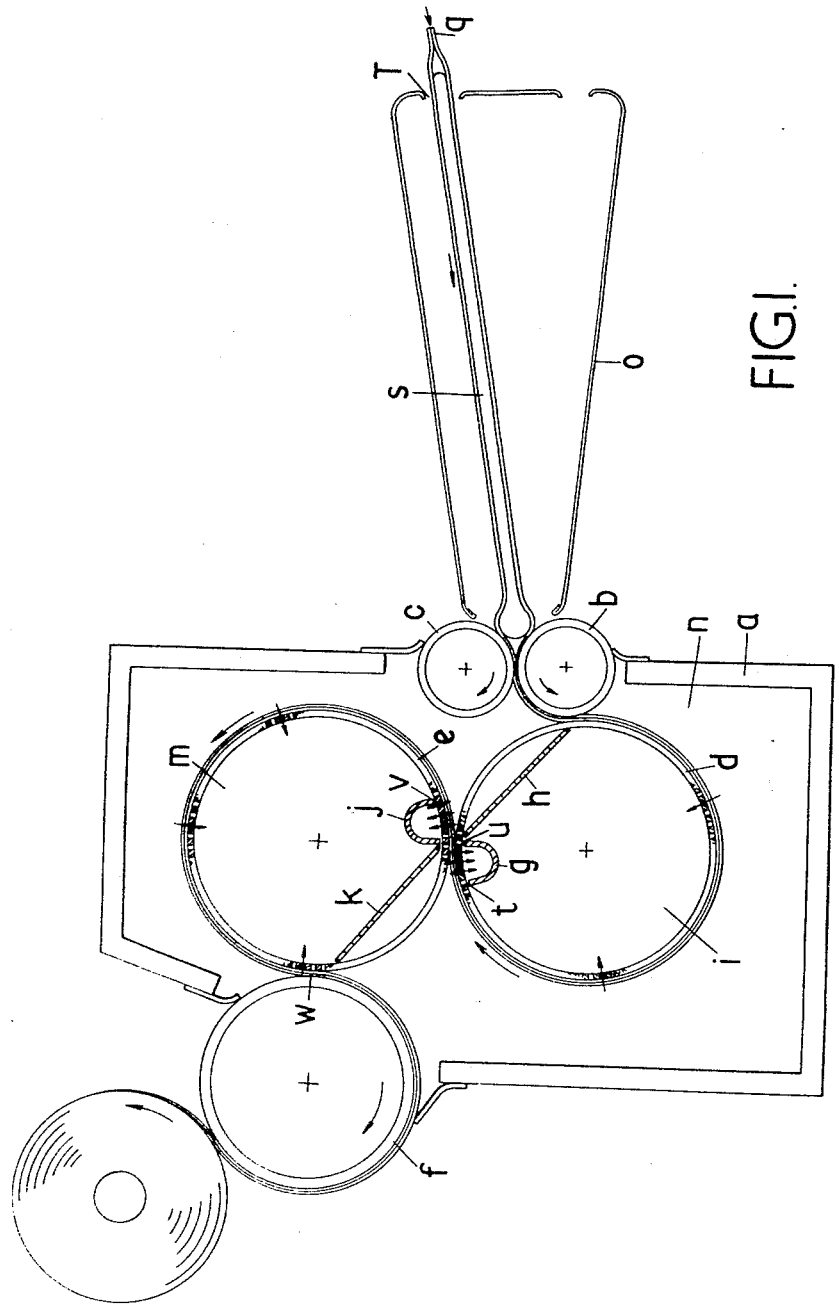

This invention relates to methods of and means for shrinking knitted fabric or any sheet-like pliable material hereinafter referred to as "fabric" which is, or, by the application of physical and/or chemical means, can be made to be nonelastically formable.

It is mainly intended for knitted fabric of natural or man-made fiber, preferably, but not exclusively, in tubular form.

Fabric in the course of manufacture generally becomes stretched in a longitudinal direction and consequently a garment made from fabric in that condition is liable to shrinkage in the longitudinal direction when it is washed.

Hitherto attempts have been made to mitigate this drawback by stretching the fabric in a transverse direction while in flattened tubular form but while this may remove a tendency to shrink in the longitudinal direction on washing, it nevertheless imparts a tendency to shrink in the transverse direction.

In another attempt to solve this problem, flattened tubular knitted fabric has been led over part of the periphery of a roller, faced with friction material, through a narrow gap separating the roller face from a fixed shoe plate and thence over part of the periphery of a contiguous second roller which is faced with soft resilient material, with the two rollers being driven in opposite directions such that the peripheral speed of the second roller is less than that of the first roller so as to compact the fabric lengthwise.

The object of the present invention is to provide improved or simplified methods and means for effecting shrinkage in the fabric by compacting it lengthwise without appreciably affecting its width.

According to the present invention, there is provided a method of shrinking fabric including the steps of conveying the fabric, which has been rendered compliant by any known means, between two perforated conveying means with the conveying means being arranged so that a portion of one conveying means is adjacent a portion of the other conveying means, moving the conveying means so that the adjacent portions move in parallel directions, the speed of one conveying means being greater than the speed of the other conveying means, providing a pressure differential across a part of the faster moving conveying means so that the fabric is held substantially immovably in contact with the faster moving conveying means at a region immediately before the fabric reaches the adjacent portions, and providing a pressure differential across a part of the slower moving conveying means so that the fabric is held substantially immovably in contact with the slower moving conveying means at a region immediately after the fabric has passed between said adjacent portions.

Preferably, the conveying means are two adjacent rollers rotating in opposite directions.

The invention also is directed to a shrinking machine including two conveying means, each conveying means having a portion adjacent to a section of the other conveying means, the two conveying means being adapted to move in parallel directions at their points of adjacency, the speed of one of the conveying means being greater than the speed of the other conveying means, means for applying a pressure differential across a part of the faster moving conveying means so that the fabric is held substantially immovably in contact with the faster moving conveying means at a region immediately before the fabric reaches the adjacent portions and means for applying a pressure differential across a part of the slower moving conveying means so that the fabric is held substantially immovably in contact with the slower moving conveying means at a region immediately after the fabric has passed between said adjacent portions.

Preferably, the two conveying means are two adjacent rollers adapted to rotate in opposite directions.

Figure 2:
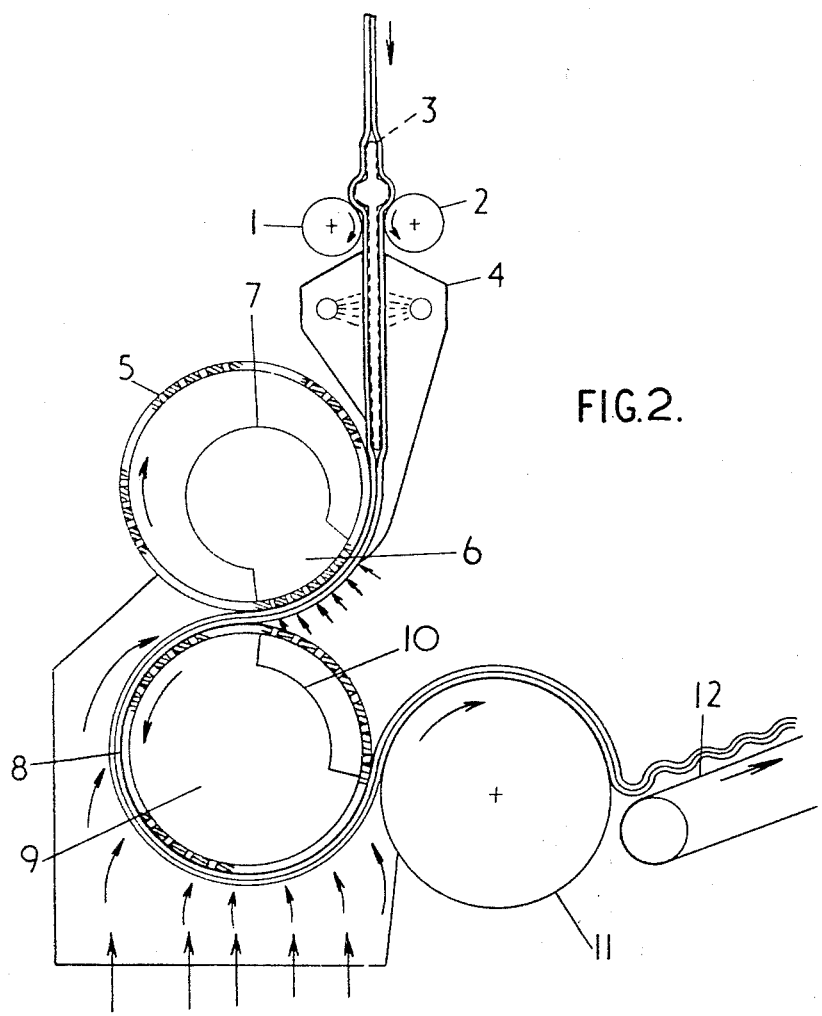

In the diagrammatic drawings, FIGURE 1 illustrates one example of the invention and FIGURE 2 illustrates a second example of the invention.

In FIGURE 1, a chamber $a$ is provided in which are housed a pair of heated oppositely-rotated entrance rollers $b$, $c$, a pair of perforated oppositely-rotated rollers $d$, $e$, with the roller $d$ being rotated faster than the roller $e$ and a driven exit roller $f$ acting as a batching-up roller, the peripheral speed of which is substantially the same as that of the roller $e$.

The perforated roller $d$ is furnished internally with a fixed channel casing $g$ within which a substantial degree of vacuum, for example 8–20 inches water gauge, is maintained and a fixed baffle plate $h$. A space $i$ within the roller $d$ below the casing $g$ and below the baffle $h$ is maintained at a low degree of vacuum, for example, 1–2 inches water gauge.

The roller $e$ is provided with a similar channel casing $j$ with a substantial degree of internal vacuum, a fixed baffle $k$ and a space $m$ maintained at a low degree of vacuum.

A space $n$ within the chamber $a$ is preferably maintained at a pressure slightly above (for example ⅛ inch water gauge) atmospheric pressure. Outside the chamber $a$ a conventional steaming chamber $o$ is provided.

In operation, flat tubular knitted fabric $q$ to be shrunk is fed through a slot T in the chamber $o$ to which steam is supplied to render the fabric highly compliant and thence over a stretcher member $s$ maintained in position by known means for passage between the rollers $b$, $c$.

The fabric upon coming in contact with the periphery of the roller $d$ is held thereagainst by the vacuum within the space $i$ until it reaches a point adjacent to edge $t$ of the casing $g$. During its passage from this point to a point adjacent to edge $u$ of the casing $g$, the fabric is held so firmly against the periphery of the roller $d$ as to be substantially immovable relatively thereto.

At this latter point, the fabric encounters the periphery of the slower running roller $e$ and since it is held equally firmly against that roller by the vacuum within the casing $j$ until a point adjacent to the edge $v$ of the casing $j$ is reached, stitches of the fabric are compressed in lengthwise direction while at the same time the fabric is prevented from bunching.

From point $v$ to the point $w$, the now compacted fabric is lightly held against the roller $e$ by the vacuum existing within the space $m$.

In addition to steam being supplied to the chamber $o$, it may be supplied to the space $n$ in the chamber $a$ to bring the fabric into the high state of compliance requisite for the attainment of the successful degree of lengthwise shrinkage sought by the present invention.

The second example of the invention is shown diagrammatically in FIGURE 2 and includes a pair of oppositely-rotated entrance rollers 1, 2 which move the flat tubular fabric, while on a stretcher 3, through a steam box 4 in which a steam tube on either side of the fabric blows steam onto the fabric while in its stretched condition on the stretcher 3. The fabric passes out of the box 4 and then comes off the end or tail of the stretcher 3 into engagement with a perforated roller 5 adapted to rotate clockwise and contacting a suction duct 6 defined by a fixed baffle 7 for applying a suction of between 10″ and 25″ water gauge to approximately 20% of the periphery of the perforated roller so that the fabric is held to the periphery of the roller 5 by the radially inwardly-directed suction of coil air, steam, water-mist and/or any other medium suitable for making the fabric more pliable.

At the point where the suction in the roller 5 ceases, the fabric enters a nip formed between roller 5 and another perforated roller 8 adapted to rotate in the opposite direction at a slower and adjustable peripheral speed than the roller 5 and having an inner suction duct 9 defined by fixed baffle 10 for applying a suction pressure of between 10″ and 25″ water gauge to about 75% of the periphery of the roller 8 starting at the nip of the roller 8 with the roller 5.

Hot air from a heater is channelled onto the outer surface of the fabric while it is held on roller 8 and this hot air is, of course sucked into the duct 9. As the fabric reaches the edge of the suction duct 9 it passes into a further nip between the roller 8 and a plain driven roller 11 which takes the fabric onto a conveyor 12 which conveys the fabric out of the machine. Since the slower moving roller 8 has both to hold the fabric and dry the same it is desirable that the fabric remain in contact with the roller 8 for a large proportion of the periphery thereof.

Up to the present it has been found that, though more costly in power, one large high suction duct in each roller is simpler and more effective than the shrinking machine disclosed in FIGURE 1, it may be that experience will show that a combination of low and high suction in the duct in each roller has advantages.

It will be appreciated that the shrinking method is suitable for dry fabric, which, in the machines described, is made pliable partly in the steaming chamber of the machine, and if required by additional conditioning, for example with water-mist, prior to feeding into the machine. However, this shrinking method is also suitable for wet fabric which will dry out on the roller 8 by the passage of the hot air and emerges from the machine both shrunk and dry. It is also possible to feed wet fabric impregnated with chemical substances through the machine to achieve certain effects on the fabric.

I claim:
1. A method of shrinking fabric including the steps of conveying a fabric which has been rendered compliant between two perforated conveying means so arranged that a portion of one conveying means is adjacent a portion of the other conveying means, moving the conveying means so that the adjacent portions move in parallel directions, with the speed of one conveying means being greater than the speed of the other conveying means, applying a pressure differential across a part of the faster moving conveying means so that the fabric is held substantially immovably in contact with the faster moving conveying means at a region immediately before the fabric reaches the adjacent portions, and applying a pressure differential across a part of the slower moving conveying means so that the fabric is held substantially immovably in contact with the slower moving conveying means at a region immediately after the fabric has passed between said adjacent portions whereby the fabric is compacted without buckling solely by the speed and pressure differentials across the fabric within the area defined by the pressure differentials.

2. The method as claimed in claim 1 wherein said part of the faster moving conveying means is a small proportion of the total periphery of the faster moving conveying means and said part of the slower moving conveying means is a large proportion of the total periphery of the slower moving conveying means.

3. The method as claimed in claim 1 wherein the pressure differential is provided across at least one of the conveying means by reducing the pressure within said at least one conveying means to a value between 10″ and 25″ water gauge below atmospheric pressure.

4. The method as claimed in claim 1 wherein said part of the faster moving conveying means is a small proportion of the periphery of the faster moving conveying means applying a second pressure differential smaller than the first mentioned pressure differential across another part of the periphery of the faster moving conveying means so that the fabric is held in contact with the periphery of the faster moving conveying means at a region immediately before the fabric reaches the first mentioned region of the faster moving conveying means said part of the slower moving conveying means is a small proportion of the periphery of the slower moving conveying means and appying a further pressure differential smaller than the first mentioned pressure differential across another part of the periphery of the slower moving conveying means so that the fabric is held in contact with the slower moving conveying means at a region immediately following the point at which the fabric emerges from the first mentioned region of the slower moving conveying means.

5. A shrinking machine for fabric including two rollers, each roller having a portion adjacent a section of the other roller, with the adjacent sections capable of movement in parallel directions, the speed of one of the rollers being greater than the speed of the other roller means for applying a pressure differential across a part of the faster moving roller so that the fabric is held substantially immovably in contact with the faster moving roller at a region immediately before the fabric reaches said adjacent portions, and means for applying a pressure differential across a part of the slower moving roller so that the fabric is held substantially immovably in contact with the slower moving roller at a region immediately after the fabric has passed between said adjacent portions whereby the fabric is compacted without buckling solely by the speed and pressure differentials across the fabric within the area defined by the pressure differentials.

6. The shrinking machine as claimed in claim 5 wherein said part of the faster roller is a small proportion of the total periphery of the faster roller and said part of the slower roller is a large proportion of the periphery of the slower roller.

7. The shrinking machine as claimed in claim 5 wherein steaming means is provided to supply steam to the fabric and stretching means is provided to stretch the fabric widthwise before the fabric is fed to the faster roller.

8. A shrinking machine for fabric including two parallel adjacent rollers adapted to rotate in opposite directions with the speed of one roller being greater than the speed of the other roller, each roller having a portion adjacent a section of the other roller, means for applying a pressure differential across a part of the periphery of the faster roller whereby the fabric is held substantially immovably in contact with the periphery of the faster roller at a region immediately before the fabric reaches said adjacent portions, means for applying a pressure differential across a part of the periphery of the slower roller so that the fabric is held substantially immovably in contact with the periphery of the slower roller at a region immediately after the fabric has passed between said adjacent portions, and the said faster roller including second means for applying a second differential pressure smaller than the first mentioned differential pressure across a second part of the periphery of the faster roller located in the region through which the fabric passes immediately before the fabric reaches said first mentioned region of the faster roller whereby the fabric is held in contact with the periphery of the faster roller at a region immediately before the fabric reaches the first mentioned region.

9. A shrinking machine for fabric including two parallel adjacent rollers adapted to rotate in opposite directions with the speed of one roller being greater than the speed of the other roller, each roller having a portion adjacent a section of the other roller, means for applying a pressure differential across a part of the periphery of the faster roller whereby the fabric is held substantially immovably in contact with the periphery of the faster roller at a region immediately before the fabric reaches said adjacent portions, means for applying a pressure differential across a part of the periphery of the slower roller so that the fabric is held substantially immovably in contact with the periphery of the slower roller at a region immediately after the fabric has passed between said adjacent portions, and said slower roller including second means for applying a second differential pressure smaller than the first mentioned differential pressure across a second part of the periphery of the slower roller located in the region through which the fabric passes immediately following the first mentioned region of the second roller whereby the fabric is held in contact with the periphery of the slower roller at a region immediately following the point at which the fabric emerges from the first mentioned region of the slower roller.

References Cited

UNITED STATES PATENTS

| | | | |
|---|---|---|---|
| 1,837,408 | 12/1931 | Cluett | 26—18.6 |
| 2,310,664 | 2/1943 | Mason | 26—18.6 |
| 2,765,514 | 10/1956 | Walton | 26—18.6 |
| 3,015,145 | 1/1962 | Cohn et al. | 26—18.6 |
| 3,112,054 | 11/1963 | Fleissner | 226—95 |
| 3,226,796 | 1/1966 | Fox et al. | 26—18.6 XR |

ROBERT R. MACKEY, *Primary Examiner.*

U.S. Cl. X.R.

226—95